(12) United States Patent
Lovorn et al.

(10) Patent No.: US 8,281,875 B2
(45) Date of Patent: Oct. 9, 2012

(54) PRESSURE AND FLOW CONTROL IN DRILLING OPERATIONS

(75) Inventors: James R. Lovorn, Tomball, TX (US); Carlos Bruder, Calgary (CA); Neal G. Skinner, Lewisville, TX (US); Joe Karigan, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 323 days.

(21) Appl. No.: 12/638,012

(22) Filed: Dec. 15, 2009

(65) Prior Publication Data

US 2011/0139506 A1    Jun. 16, 2011

(30) Foreign Application Priority Data

Dec. 19, 2008 (WO) ................ PCT/US2008/087686

(51) Int. Cl.
*E21B 44/00* (2006.01)
(52) U.S. Cl. .......................................... 175/25; 175/70
(58) Field of Classification Search .................... 175/25, 175/57, 70, 217
See application file for complete search history.

(56) References Cited

U.S. PATENT DOCUMENTS

| | | | |
|---|---|---|---|
| 2,223,397 A | 12/1940 | White et al. |
| 3,603,409 A | 9/1971 | Watkins |
| 4,046,191 A | 9/1977 | Neath |
| 4,063,602 A | 12/1977 | Howell et al. |
| 4,099,583 A | 7/1978 | Maus |
| 4,194,567 A | 3/1980 | Marais |
| 4,275,788 A | 6/1981 | Sweatman |
| 4,291,772 A | 9/1981 | Beynet |
| 4,387,770 A | 6/1983 | Hill |
| 4,468,056 A | 8/1984 | Kramer et al. |
| 4,626,135 A | 12/1986 | Roche |
| 4,627,496 A | 12/1986 | Ashford et al. |
| 4,813,495 A | 3/1989 | Leach |
| 4,819,727 A | 4/1989 | Jennings, Jr. |
| 4,880,060 A | 11/1989 | Schwendemann et al. |
| 5,006,845 A | 4/1991 | Calcar et al. |

(Continued)

FOREIGN PATENT DOCUMENTS

EP    1432887 B1    3/2003

(Continued)

OTHER PUBLICATIONS

International Search Report and Written Opinion issued Feb. 12, 2009, for International Patent Application No. PCT/US08/87686, 7 pages.

(Continued)

*Primary Examiner* — William P Neuder
(74) *Attorney, Agent, or Firm* — Smith IP Services, P.C.

(57) ABSTRACT

A well drilling system for use with a drilling fluid pump includes a flow control device regulating flow from the pump to a drill string interior; and another flow control device regulating flow through a line in communication with an annulus. Flow is simultaneously permitted through the flow control devices. A method of maintaining a desired bottom hole pressure includes dividing drilling fluid flow between a line in communication with a drill string interior and a line in communication with an annulus; the flow dividing step including permitting flow through a flow control device interconnected between a pump and the drill string interior; and the flow dividing step including permitting flow through another flow control device interconnected between the pump and the annulus, while flow is permitted through the first flow control device.

19 Claims, 4 Drawing Sheets

U.S. PATENT DOCUMENTS

| | | | |
|---|---|---|---|
| 5,327,973 | A | 7/1994 | Jennings, Jr. |
| 5,529,128 | A | 6/1996 | Peterson et al. |
| 5,720,356 | A | 2/1998 | Gardes |
| 5,771,971 | A | 6/1998 | Horton et al. |
| 5,771,974 | A | 6/1998 | Stewart et al. |
| 6,053,252 | A | 4/2000 | Edwards |
| 6,065,550 | A | 5/2000 | Gardes |
| 6,102,673 | A | 8/2000 | Mott et al. |
| 6,138,774 | A | 10/2000 | Bourgoyne, Jr. et al. |
| 6,145,591 | A | 11/2000 | Boncan et al. |
| 6,173,768 | B1 | 1/2001 | Watson |
| 6,230,824 | B1 | 5/2001 | Peterman et al. |
| 6,263,982 | B1 | 7/2001 | Hannegan et al. |
| 6,273,193 | B1 | 8/2001 | Hermann et al. |
| 6,325,159 | B1 | 12/2001 | Peterman et al. |
| 6,328,107 | B1 | 12/2001 | Maus |
| 6,450,262 | B1 | 9/2002 | Regan |
| 6,454,022 | B1 | 9/2002 | Sangesland et al. |
| 6,457,540 | B2 | 10/2002 | Gardes |
| 6,470,975 | B1 | 10/2002 | Bourgoyne et al. |
| 6,527,062 | B2 | 3/2003 | Elkins et al. |
| 6,571,873 | B2 | 6/2003 | Maus |
| 6,598,682 | B2 | 7/2003 | Johnson et al. |
| 6,662,110 | B1 | 12/2003 | Bargach et al. |
| 6,668,943 | B1 | 12/2003 | Maus et al. |
| 6,732,798 | B2 | 5/2004 | Johnson et al. |
| 6,732,804 | B2 | 5/2004 | Hosie et al. |
| 6,739,397 | B2 | 5/2004 | Ayling |
| 6,745,857 | B2 | 6/2004 | Gjedebo |
| 6,802,379 | B2 | 10/2004 | Dawson et al. |
| 6,814,140 | B2 | 11/2004 | Robichaux |
| 6,820,702 | B2 | 11/2004 | Niedermayr et al. |
| 6,840,322 | B2 | 1/2005 | Haynes et al. |
| 6,854,532 | B2 | 2/2005 | Fincher et al. |
| 6,892,812 | B2 | 5/2005 | Niedermayr et al. |
| 6,904,981 | B2 | 6/2005 | Van Riet |
| 6,913,092 | B2 | 7/2005 | Bourgoyne et al. |
| 6,920,085 | B2 | 7/2005 | Finke et al. |
| 6,981,561 | B2 | 1/2006 | Krueger et al. |
| 7,023,691 | B1 | 4/2006 | Feight et al. |
| 7,032,691 | B2 | 4/2006 | Humphreys |
| 7,044,237 | B2 | 5/2006 | Leuchtenberg |
| 7,055,627 | B2 | 6/2006 | Fontana et al. |
| 7,073,591 | B2 | 7/2006 | Massie et al. |
| 7,080,685 | B2 | 7/2006 | Bailey et al. |
| 7,090,036 | B2 | 8/2006 | DeBoer |
| 7,093,662 | B2 | 8/2006 | De Boer |
| 7,096,975 | B2 | 8/2006 | Aronstam et al. |
| 7,114,571 | B2 | 10/2006 | Gatherar et al. |
| 7,134,489 | B2 | 11/2006 | Van Riet |
| 7,158,886 | B2 | 1/2007 | Hou et al. |
| 7,159,669 | B2 | 1/2007 | Bourgoyne et al. |
| 7,174,975 | B2 | 2/2007 | Krueger et al. |
| 7,185,718 | B2 | 3/2007 | Gardes |
| 7,185,719 | B2 | 3/2007 | Van Riet |
| 7,201,231 | B2 | 4/2007 | Chaplin et al. |
| 7,207,399 | B2 | 4/2007 | Duhe et al. |
| 7,237,613 | B2 | 7/2007 | Radi et al. |
| 7,237,623 | B2 | 7/2007 | Hannegan |
| 7,258,171 | B2 | 8/2007 | Bourgoyne et al. |
| 7,264,058 | B2 | 9/2007 | Fossli |
| 7,270,185 | B2 | 9/2007 | Fontana et al. |
| 7,278,496 | B2 | 10/2007 | Leuchtenberg |
| 7,281,593 | B2 | 10/2007 | Steiner et al. |
| 7,350,597 | B2 | 4/2008 | Reitsma et al. |
| 7,353,887 | B2 | 4/2008 | Krueger et al. |
| 7,367,410 | B2 | 5/2008 | Sangesland |
| 7,367,411 | B2 | 5/2008 | Leuchtenberg |
| 7,395,878 | B2 | 7/2008 | Reitsma et al. |
| 7,497,266 | B2 | 3/2009 | Fossli |
| 7,513,310 | B2 | 4/2009 | Fossli |
| 7,562,723 | B2 | 7/2009 | Reitsma |
| 7,650,950 | B2 | 1/2010 | Leuchtenberg |
| 7,658,228 | B2 | 2/2010 | Moksvold |
| 7,677,329 | B2 | 3/2010 | Stave |
| 7,708,064 | B2 | 5/2010 | Sehsah |
| 7,721,822 | B2 | 5/2010 | Krueger et al. |
| 7,762,329 | B1 | 7/2010 | Morgan et al. |
| 7,806,203 | B2 | 10/2010 | Krueger et al. |
| 7,913,774 | B2 * | 3/2011 | Partouche ........................ 175/48 |
| 7,926,593 | B2 | 4/2011 | Bailey et al. |
| 8,033,335 | B2 | 10/2011 | Orbell et al. |
| 2002/0092655 | A1 | 7/2002 | Fincher et al. |
| 2002/0108783 | A1 | 8/2002 | Elkins et al. |
| 2002/0112888 | A1 | 8/2002 | Leuchtenberg |
| 2003/0066650 | A1 | 4/2003 | Fontana et al. |
| 2003/0089498 | A1 | 5/2003 | Johnson et al. |
| 2003/0098181 | A1 | 5/2003 | Aronstam et al. |
| 2003/0111799 | A1 | 6/2003 | Gilmore |
| 2003/0127230 | A1 | 7/2003 | Von Eberstein, Jr. et al. |
| 2003/0139916 | A1 | 7/2003 | Choe et al. |
| 2003/0220742 | A1 | 11/2003 | Niedermayr et al. |
| 2004/0010746 | A1 | 1/2004 | Lucas et al. |
| 2004/0040746 | A1 | 3/2004 | Niedermayr et al. |
| 2004/0124008 | A1 | 7/2004 | Fincher et al. |
| 2004/0178001 | A1 | 9/2004 | Bourgoyne et al. |
| 2004/0206548 | A1 | 10/2004 | Aronstam et al. |
| 2005/0061546 | A1 | 3/2005 | Hannegan |
| 2005/0092522 | A1 | 5/2005 | Humphreys |
| 2005/0092523 | A1 | 5/2005 | McCaskill et al. |
| 2006/0006004 | A1 | 1/2006 | Terry et al. |
| 2006/0021755 | A1 | 2/2006 | Radi et al. |
| 2006/0065402 | A9 | 3/2006 | Fontana et al. |
| 2006/0070772 | A1 | 4/2006 | De Boer et al. |
| 2006/0086538 | A1 | 4/2006 | Van Riet |
| 2006/0102387 | A1 | 5/2006 | Bourgoyne et al. |
| 2006/0124300 | A1 | 6/2006 | Steiner et al. |
| 2006/0169491 | A1 | 8/2006 | Fossli |
| 2006/0185857 | A1 | 8/2006 | York et al. |
| 2006/0191716 | A1 | 8/2006 | Humphreys |
| 2006/0207795 | A1 | 9/2006 | Kinder et al. |
| 2007/0068704 | A1 | 3/2007 | Krueger et al. |
| 2007/0168056 | A1 | 7/2007 | Shayegi et al. |
| 2007/0240875 | A1 | 10/2007 | Van Riet |
| 2007/0278007 | A1 | 12/2007 | Krueger et al. |
| 2008/0041149 | A1 | 2/2008 | Leuchtenberg |
| 2008/0060846 | A1 | 3/2008 | Belcher et al. |
| 2008/0105434 | A1 | 5/2008 | Orbell et al. |
| 2009/0211239 | A1 | 8/2009 | Askeland |
| 2010/0006297 | A1 | 1/2010 | Stave |
| 2010/0018715 | A1 | 1/2010 | Orbell et al. |
| 2011/0024189 | A1 | 2/2011 | Saeed et al. |
| 2011/0139506 | A1 | 6/2011 | Lovorn et al. |
| 2011/0139509 | A1 | 6/2011 | Pool et al. |
| 2011/0290562 | A1 * | 12/2011 | Standifird et al. .............. 175/57 |

FOREIGN PATENT DOCUMENTS

| | | | |
|---|---|---|---|
| EP | 1488073 | B1 | 8/2003 |
| EP | 1240404 | B1 | 12/2003 |
| EP | 1595057 | B1 | 9/2004 |
| EP | 1071862 | B1 | 11/2004 |
| EP | 1664478 | B1 | 2/2005 |
| EP | 1356186 | B1 | 6/2005 |
| EP | 1907664 | A1 | 4/2008 |
| EP | 1917444 | A1 | 5/2008 |
| EP | 1969204 | A2 | 9/2008 |
| EP | 2053196 | A1 | 4/2009 |
| EP | 2150681 | A1 | 2/2010 |
| EP | 2171207 | A1 | 4/2010 |
| EP | 2179127 | A1 | 4/2010 |
| EP | 2231997 | A2 | 9/2010 |
| GB | 2229787 | A | 10/1990 |
| WO | 9942696 | | 8/1999 |
| WO | 01/65060 | A1 | 9/2001 |
| WO | 0183941 | A1 | 11/2001 |
| WO | 0190528 | A1 | 11/2001 |
| WO | 02/50398 | A1 | 6/2002 |
| WO | 0244518 | A1 | 6/2002 |
| WO | 03025334 | A8 | 3/2003 |
| WO | 03025336 | A1 | 3/2003 |
| WO | 03071091 | A9 | 8/2003 |
| WO | 2004005667 | A1 | 1/2004 |
| WO | 2004074627 | A1 | 9/2004 |
| WO | 2004085788 | A3 | 10/2004 |
| WO | 2005001237 | A1 | 1/2005 |
| WO | 2005017308 | A1 | 2/2005 |
| WO | 2005/042917 | A1 | 5/2005 |

| | | | |
|---|---|---|---|
| WO | 2006029379 A1 | 3/2006 |
| WO | 2006031119 A1 | 3/2006 |
| WO | 2006099362 A1 | 9/2006 |
| WO | 2006118920 A3 | 11/2006 |
| WO | 2006138565 A1 | 12/2006 |
| WO | 2007/008085 A1 | 1/2007 |
| WO | 2007008085 A1 | 1/2007 |
| WO | 2007016000 A1 | 2/2007 |
| WO | 2007030017 A1 | 3/2007 |
| WO | 2007081711 A3 | 7/2007 |
| WO | 2007112291 A3 | 10/2007 |
| WO | 2007112292 A3 | 10/2007 |
| WO | 2007124330 A3 | 11/2007 |
| WO | 2007126833 A1 | 11/2007 |
| WO | 2008133523 A1 | 11/2008 |
| WO | 2008134266 A1 | 11/2008 |
| WO | 2008151128 A9 | 12/2008 |
| WO | 2008156376 A1 | 12/2008 |
| WO | 2009017418 A1 | 2/2009 |
| WO | 2009018448 A2 | 2/2009 |
| WO | 2009058706 A2 | 5/2009 |
| WO | 2009086442 A3 | 7/2009 |
| WO | 2009111412 A2 | 9/2009 |
| WO | 2009123476 A1 | 10/2009 |
| WO | 2010065646 A3 | 6/2010 |
| WO | 2010071656 A1 | 6/2010 |
| WO | 2010095947 A1 | 8/2010 |
| WO | 2011043764 A1 | 4/2011 |

OTHER PUBLICATIONS

International Search Report and Written Opinion issued Sep. 22, 2008, for International Patent Application No. PCT/US07/83974, 16 pages.
International Preliminary Report on Patentability issued May 22, 2009, for International Patent Application Serial No. PCT/US07/83974, 13 pages.
Office Action issued Nov. 25, 2011 for U.S. Appl. No. 13/084,841, 19 pages.
International Search Report with Written Opinion issued Dec. 13, 2011 for PCT Patent Application No. PCT/US11/035751, 16 pages.
International Search Report with Written Opinion issued Dec. 21, 2011 for PCT Patent Application No. PCT/US11/031790, 15 pages.
Singapore Examination Report issued Dec. 27, 2011 for SG Patent Application No. 200903022-2, 8 pages.
Office Action issued Feb. 7, 2012 for U.S. Appl. No. 13/022,964, 15 pages.
International Search Report with Written Opinion issued Feb. 8, 2012 for PCT Patent Application No. PCT/US11/031767, 9 pages.
International Preliminary Report on Patentability issued Feb. 9, 2012 for PCT Patent Application No. PCT/US09/052227, 7 pages.
Patent Application and drawings, filed Feb. 28, 2012, U.S. Appl. No. 13/392,900, 34 pages.
Patent Application and drawings, filed Mar. 19, 2012, U.S. Appl. No. 13/423,366, 29 pages.
Pre-Interview First Office Action issued Jul. 14, 2010 for U.S. Appl. No. 11/936,411, 14 pages.
Australian Office Action issued Oct. 5, 2010 for AU Patent Application No. 2007317276, 2 pages.
International Search Report with Written Opinion issued Oct. 13, 2010 for PCT Patent Application No. PCT/US10/020122, 13 pages.
International Search Report with Written Opinion issued Jan. 25, 2011 for PCT Patent Application No. PCT/US10/032578, 9 pages.
International Search Report with Written Opinion issued Jun. 17, 2011 for PCT Patent Application No. PCT/US10/056433, 9 pages.
International Preliminary Report on Patentability issued Jun. 30, 2011 for PCT Patent Application No. PCT/US08/087686, 6 pages.
Office Action issued Sep. 16, 2011 for U.S. Appl. No. 12/299,411, 23 pages.
International Search Report with Written Opinion issued Nov. 21, 2011 for PCT Patent Application No. PCT/US11/036616, 13 pages.
Written Opinion issued May 13, 2010 for SG Patent Application Serial No. 2009030222, 10 pages.
Office Action issued Jan. 20, 2011 for Canadian Patent Application No. 2,668,152, 2 pages.
Written Opinion issued Feb. 15, 2011 for SG Patent Application Serial No. 200903022-2, 9 pages.
Office Action issued Mar. 7, 2011 for Australian Patent Application No. 2007317276, 2 pages.
English Translation of Office Action issued Feb. 22, 2012 for Chinese Patent Application 200780049409.0, 7 pages.
U.S. Appl. No. 13/330,059 specification and drawings filed Dec. 19, 2011, 32 pages.
U.S. Appl. No. 13/423,366 specification and drawings filed Mar. 19, 2012, 29 pages.
U.S. Appl. No. 13/492,688 specification and drawings filed Jun. 8, 2012, 62 pages.
IRIS; "Automatic Coordination of Equipment While Circulating out a Kick and Displacing the Kill-Weight Mud," IADC Well Control Europe, dated 2010, 41 pages.
Office Action issued Mar. 14, 2012 for U.S. Appl. No. 12/299,411, 36 pages.
Office Action issued Feb. 25, 2011 for U.S. Appl. No. 11/936,411, 66 pages.
GE Oil & Gas; "Hydril Pressure Control K Pulsation Dampers," product information, dated Aug. 6, 2010, 2 pages.
Weatherford International Ltd.; "Weatherford Model 7800 Rotating Control Device", article No. 4593.00, dated 2007, 5 pages.
Weatherford International Ltd.; "Model 7875 Rotating Control Device", article No. 4594.01, dated 2010, 4 pages.
Hannegan, Don; Weatherford International; "Offshore Drilling Hazard Mitigation: Controlled Pressure Drilling Redefines What is Drillable", Managed Pressure Drilling Magazine, Drilling Contractor article, dated Jan.-Feb. 2009, 4 pages.
Smith Services; "Hold 2500 Rotating Control Device", product brochure, article No. ss-04-0055, dated 2004, 4 pages.
Smith Services; "Marine Riser RCD", product presentation, dated Jul. 2009, 18 pages.
U.S. Appl. No. 13/428,366 specification and drawings filed Mar. 19, 2012, 29 pages.
U.S. Appl. No. 13/423,384 specification and drawings filed Mar. 19, 2012, 29 pages.
U.S. Appl. No. 13/406,703 specification and drawings filed Feb. 28, 2012, 42 pages.
FAIPP Office Action issue Jul. 29, 2010 for U.S. Appl. No. 11/936,411, 3 pages.
US 6,708,780, 03/2004, Bourgoyne et al. (withdrawn)

* cited by examiner

PRESSURE AND FLOW CONTROL IN DRILLING OPERATIONS

CROSS-REFERENCE TO RELATED APPLICATION

The present application claims the benefit under 35 USC §119 of the filing date of International Application No. PCT/US08/87686, filed Dec. 19, 2008. The entire disclosure of this prior application is incorporated herein by this reference.

BACKGROUND

The present disclosure relates generally to equipment utilized and operations performed in conjunction with well drilling operations and, in an embodiment described herein, more particularly provides for pressure and flow control in drilling operations.

Managed pressure drilling is well known as the art of precisely controlling bottom hole pressure during drilling by utilizing a closed annulus and a means for regulating pressure in the annulus. The annulus is typically closed during drilling through use of a rotating control device (RCD, also known as a rotating control head or rotating blowout preventer) which seals about the drill pipe as it rotates.

The means for regulating pressure in the annulus can include a choke interconnected in the mud return line and, in some applications, a backpressure pump to apply pressure to the annulus while connections are made in the drill pipe string. Unfortunately, use of a backpressure pump requires substantial capital investment, the additional pump takes up scarce space on offshore rigs, the pump output is difficult to control accurately and use of the pump interferes with normal operations on a drilling rig.

Therefore, it may be seen that improvements are needed in the art of controlling pressure and flow in drilling operations. These improvements may include the elimination of a separate backpressure pump in drilling operations, but the improvements could be utilized in conjunction with a backpressure pump, if desired.

SUMMARY

In carrying out the principles of the present disclosure, systems and methods are provided which solve at least one problem in the art. One example is described below in which flow through a standpipe line and flow through a bypass line are independently variable, thereby enabling more accurate control over flow and pressure during the drilling operation. Another example is described below in which, after a drill pipe connection is made, the standpipe line and drill pipe are filled and pressurized prior to closing off flow through the bypass line.

In one aspect, a well drilling system is provided by the disclosure below for use with a pump which pumps drilling fluid through a drill string while drilling a wellbore. The system includes a flow control device which regulates flow from the pump to an interior of the drill string, and another flow control device which regulates flow from the pump through a line in communication with an annulus formed between the drill string and the wellbore. Flow is simultaneously permitted through the flow control devices.

In another aspect, a method of maintaining a desired bottom hole pressure during a well drilling operation is provided. The method includes the step of: dividing flow of drilling fluid between a line in communication with an interior of a drill string and a line in communication with an annulus formed between the drill string and a wellbore. The flow dividing step includes permitting flow through a flow control device interconnected between a pump and the interior of the drill string. The flow dividing step further includes permitting flow through another flow control device interconnected between the pump and the annulus, while flow is permitted through the first flow control device.

In yet another aspect, a method of making a connection in a drill string, while maintaining a desired bottom hole pressure, includes the steps of:

pumping a drilling fluid from a rig mud pump and through a mud return choke during the entire connection making method;

determining a desired annulus pressure which corresponds to the desired bottom hole pressure during the entire connection making method, the annulus being formed between the drill string and a wellbore;

regulating flow of the drilling fluid through the mud return choke, thereby maintaining the desired annulus pressure, during the entire connection making method;

increasing flow through a bypass flow control device and decreasing flow through a standpipe flow control device, thereby diverting at least a portion of the drilling fluid flow from a line in communication with an interior of the drill string to a line in communication with the annulus;

preventing flow through the standpipe flow control device; then making the connection in the drill string; and then decreasing flow through the bypass flow control device and increasing flow through the standpipe flow control device, thereby diverting at least a portion of the drilling fluid flow to the line in communication with the interior of the drill string from the line in communication with the annulus.

These and other features, advantages, benefits and objects will become apparent to one of ordinary skill in the art upon careful consideration of the detailed description of representative embodiments of the disclosure hereinbelow and the accompanying drawings, in which similar elements are indicated in the various figures using the same reference numbers.

DETAILED DESCRIPTION

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
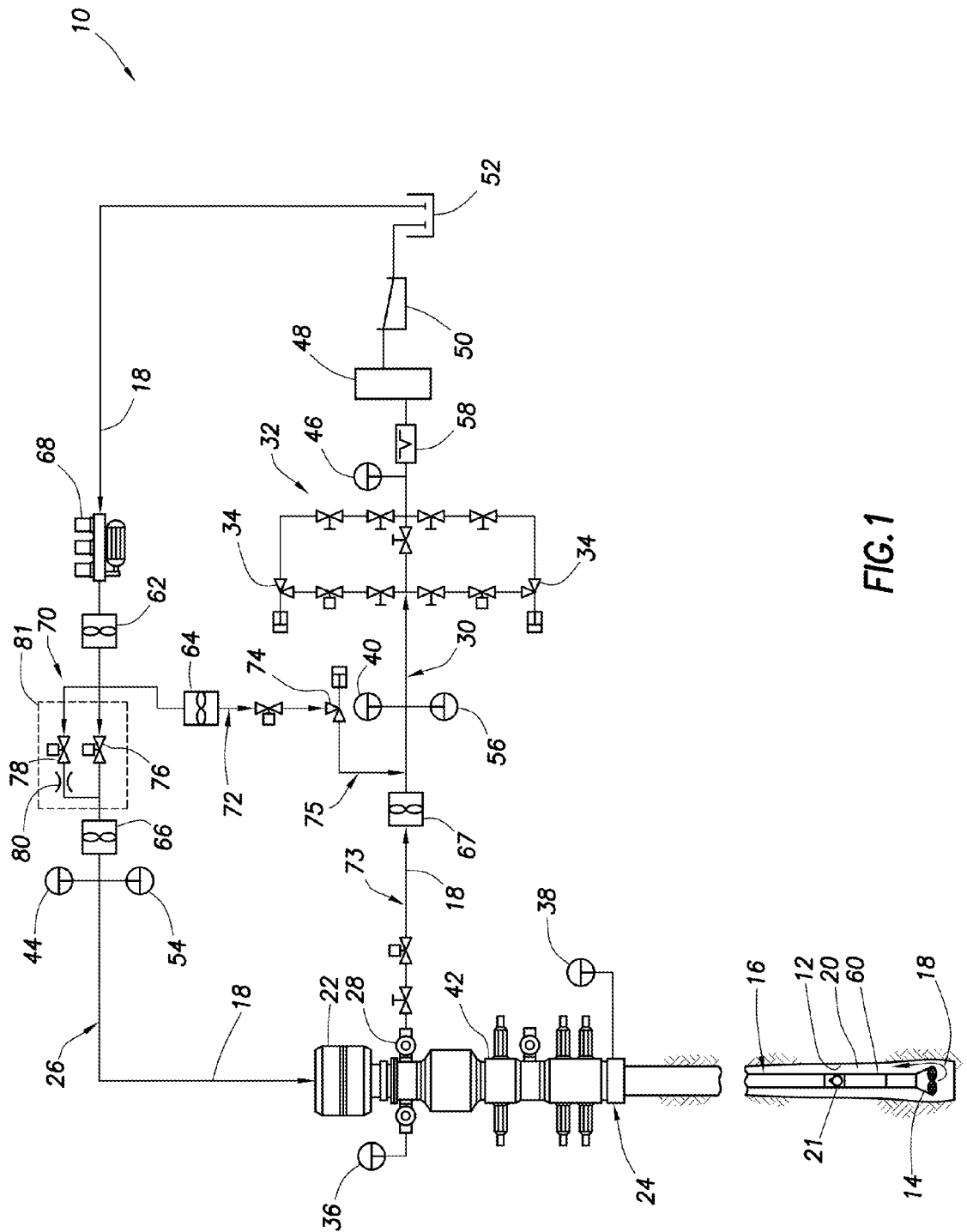
FIG. 1 is a schematic view of a well drilling system and method embodying principles of the present disclosure.

Representatively and schematically illustrated in FIG. 1 is a well drilling system 10 and associated method which embody principles of the present disclosure. In the system 10, a wellbore 12 is drilled by rotating a drill bit 14 on an end of a drill string 16. Drilling fluid 18, commonly known as mud, is circulated downward through the drill string 16, out the drill bit 14 and upward through an annulus 20 formed between the drill string and the wellbore 12, in order to cool the drill bit, lubricate the drill string, remove cuttings and provide a measure of bottom hole pressure control. A non-return valve 21 (typically a flapper-type check valve) prevents flow of the drilling fluid 18 upward through the drill string 16 (e.g., when connections are being made in the drill string).

Control of bottom hole pressure is very important in managed pressure drilling, and in other types of drilling operations. Preferably, the bottom hole pressure is accurately controlled to prevent excessive loss of fluid into the earth formation surrounding the wellbore 12, undesired fracturing of the formation, undesired influx of formation fluids into the wellbore, etc. In typical managed pressure drilling, it is desired to maintain the bottom hole pressure just greater than a pore pressure of the formation, without exceeding a fracture pressure of the formation. In typical underbalanced drilling, it is desired to maintain the bottom hole pressure somewhat less than the pore pressure, thereby obtaining a controlled influx of fluid from the formation.

Nitrogen or another gas, or another lighter weight fluid, may be added to the drilling fluid 18 for pressure control. This technique is useful, for example, in underbalanced drilling operations.

In the system 10, additional control over the bottom hole pressure is obtained by closing off the annulus 20 (e.g., isolating it from communication with the atmosphere and enabling the annulus to be pressurized at or near the surface) using a rotating control device 22 (RCD). The RCD 22 seals about the drill string 16 above a wellhead 24. Although not shown in FIG. 1, the drill string 16 would extend upwardly through the RCD 22 for connection to, for example, a rotary table (not shown), a standpipe line 26, kelley (not shown), a top drive and/or other conventional drilling equipment.

The drilling fluid 18 exits the wellhead 24 via a wing valve 28 in communication with the annulus 20 below the RCD 22. The fluid 18 then flows through mud return lines 30, 73 to a choke manifold 32, which includes redundant chokes 34 (only one of which may be used at a time). Backpressure is applied to the annulus 20 by variably restricting flow of the fluid 18 through the operative choke(s) 34.

The greater the restriction to flow through the choke 34, the greater the backpressure applied to the annulus 20. Thus, bottom hole pressure can be conveniently regulated by varying the backpressure applied to the annulus 20. A hydraulics model can be used, as described more fully below, to determine a pressure applied to the annulus 20 at or near the surface which will result in a desired bottom hole pressure, so that an operator (or an automated control system) can readily determine how to regulate the pressure applied to the annulus at or near the surface (which can be conveniently measured) in order to obtain the desired bottom hole pressure.

Pressure applied to the annulus 20 can be measured at or near the surface via a variety of pressure sensors 36, 38, 40, each of which is in communication with the annulus. Pressure sensor 36 senses pressure below the RCD 22, but above a blowout preventer (BOP) stack 42. Pressure sensor 38 senses pressure in the wellhead below the BOP stack 42. Pressure sensor 40 senses pressure in the mud return lines 30, 73 upstream of the choke manifold 32.

Another pressure sensor 44 senses pressure in the standpipe line 26. Yet another pressure sensor 46 senses pressure downstream of the choke manifold 32, but upstream of a separator 48, shaker 50 and mud pit 52. Additional sensors include temperature sensors 54, 56, Coriolis flowmeter 58, and flowmeters 62, 64, 66.

Not all of these sensors are necessary. For example, the system 10 could include only two of the three flowmeters 62, 64, 66. However, input from the sensors is useful to the hydraulics model in determining what the pressure applied to the annulus 20 should be during the drilling operation.

In addition, the drill string 16 may include its own sensors 60, for example, to directly measure bottom hole pressure. Such sensors 60 may be of the type known to those skilled in the art as pressure while drilling (PWD), measurement while drilling (MWD) and/or logging while drilling (LWD). These drill string sensor systems generally provide at least pressure measurement, and may also provide temperature measurement, detection of drill string characteristics (such as vibration, weight on bit, stick-slip, etc.), formation characteristics (such as resistivity, density, etc.) and/or other measurements. Various forms of telemetry (acoustic, pressure pulse, electromagnetic, etc.) may be used to transmit the downhole sensor measurements to the surface.

Additional sensors could be included in the system 10, if desired. For example, another flowmeter 67 could be used to measure the rate of flow of the fluid 18 exiting the wellhead 24, another Coriolis flowmeter (not shown) could be interconnected directly upstream or downstream of a rig mud pump 68, etc.

Fewer sensors could be included in the system 10, if desired. For example, the output of the rig mud pump 68 could be determined by counting pump strokes, instead of by using flowmeter 62 or any other flowmeters.

Note that the separator 48 could be a 3 or 4 phase separator, or a mud gas separator (sometimes referred to as a "poor boy degasser"). However, the separator 48 is not necessarily used in the system 10.

The drilling fluid 18 is pumped through the standpipe line 26 and into the interior of the drill string 16 by the rig mud pump 68. The pump 68 receives the fluid 18 from the mud pit 52 and flows it via a standpipe manifold 70 to the standpipe 26, the fluid then circulates downward through the drill string 16, upward through the annulus 20, through the mud return lines 30, 73, through the choke manifold 32, and then via the separator 48 and shaker 50 to the mud pit 52 for conditioning and recirculation.

Note that, in the system 10 as so far described above, the choke 34 cannot be used to control backpressure applied to the annulus 20 for control of the bottom hole pressure, unless the fluid 18 is flowing through the choke.

In conventional overbalanced drilling operations, such a situation will arise whenever a connection is made in the drill string 16 (e.g., to add another length of drill pipe to the drill string as the wellbore 12 is drilled deeper), and the lack of circulation will require that bottom hole pressure be regulated solely by the density of the fluid 18.

In the system 10, however, flow of the fluid 18 through the choke 34 can be maintained, even though the fluid does not circulate through the drill string 16 and annulus 20, while a connection is being made in the drill string. Thus, pressure can still be applied to the annulus 20 by restricting flow of the fluid 18 through the choke 34, even though a separate backpressure pump may not be used.

Instead, the fluid 18 is flowed from the pump 68 to the choke manifold 32 via a bypass line 72, 75 when a connection is made in the drill string 16. Thus, the fluid 18 can bypass the standpipe line 26, drill string 16 and annulus 20, and can flow directly from the pump 68 to the mud return line 30, which remains in communication with the annulus 20. Restriction of this flow by the choke 34 will thereby cause pressure to be applied to the annulus 20.

As depicted in FIG. 1, both of the bypass line 75 and the mud return line 30 are in communication with the annulus 20 via a single line 73. However, the bypass line 75 and the mud return line 30 could instead be separately connected to the wellhead 24, for example, using an additional wing valve (e.g., below the RCD 22), in which case each of the lines 30, 75 would be directly in communication with the annulus 20. Although this might require some additional plumbing at the rig site, the effect on the annulus pressure would be essentially the same as connecting the bypass line 75 and the mud return line 30 to the common line 73. Thus, it should be appreciated that various different configurations of the components of the system 10 may be used, without departing from the principles of this disclosure.

Flow of the fluid 18 through the bypass line 72, 75 is regulated by a choke or other type of flow control device 74. Line 72 is upstream of the bypass flow control device 74, and line 75 is downstream of the bypass flow control device.

Flow of the fluid 18 through the standpipe line 26 is substantially controlled by a valve or other type of flow control device 76. Note that the flow control devices 74, 76 are independently controllable, which provides substantial benefits to the system 10, as described more fully below.

Since the rate of flow of the fluid 18 through each of the standpipe and bypass lines 26, 72 is useful in determining how bottom hole pressure is affected by these flows, the flowmeters 64, 66 are depicted in FIG. 1 as being interconnected in these lines. However, the rate of flow through the standpipe line 26 could be determined even if only the flowmeters 62, 64 were used, and the rate of flow through the bypass line 72 could be determined even if only the flowmeters 62, 66 were used. Thus, it should be understood that it is not necessary for the system 10 to include all of the sensors depicted in FIG. 1 and described herein, and the system could instead include additional sensors, different combinations and/or types of sensors, etc.

In another beneficial feature of the system 10, a bypass flow control device 78 and flow restrictor 80 may be used for filling the standpipe line 26 and drill string 16 after a connection is made, and equalizing pressure between the standpipe line and mud return lines 30, 73 prior to opening the flow control device 76. Otherwise, sudden opening of the flow control device 76 prior to the standpipe line 26 and drill string 16 being filled and pressurized with the fluid 18 could cause an undesirable pressure transient in the annulus 20 (e.g., due to flow to the choke manifold 32 temporarily being lost while the standpipe line and drill string fill with fluid, etc.).

By opening the standpipe bypass flow control device 78 after a connection is made, the fluid 18 is permitted to fill the standpipe line 26 and drill string 16 while a substantial majority of the fluid continues to flow through the bypass line 72, thereby enabling continued controlled application of pressure to the annulus 20. After the pressure in the standpipe line 26 has equalized with the pressure in the mud return lines 30, 73 and bypass line 75, the flow control device 76 can be opened, and then the flow control device 74 can be closed to slowly divert a greater proportion of the fluid 18 from the bypass line 72 to the standpipe line 26.

Before a connection is made in the drill string 16, a similar process can be performed, except in reverse, to gradually divert flow of the fluid 18 from the standpipe line 26 to the bypass line 72 in preparation for adding more drill pipe to the drill string 16. That is, the flow control device 74 can be gradually opened to slowly divert a greater proportion of the fluid 18 from the standpipe line 26 to the bypass line 72, and then the flow control device 76 can be closed.

Note that the flow control device 78 and flow restrictor 80 could be integrated into a single element (e.g., a flow control device having a flow restriction therein), and the flow control devices 76, 78 could be integrated into a single flow control device 81 (e.g., a single choke which can gradually open to slowly fill and pressurize the standpipe line 26 and drill string 16 after a drill pipe connection is made, and then open fully to allow maximum flow while drilling).

However, since typical conventional drilling rigs are equipped with the flow control device 76 in the form of a valve in the standpipe manifold 70, and use of the standpipe valve is incorporated into usual drilling practices, the individually operable flow control devices 76, 78 are presently preferred. The flow control devices 76, 78 are at times referred to collectively below as though they are the single flow control device 81, but it should be understood that the flow control device 81 can include the individual flow control devices 76, 78.

Figure 2:
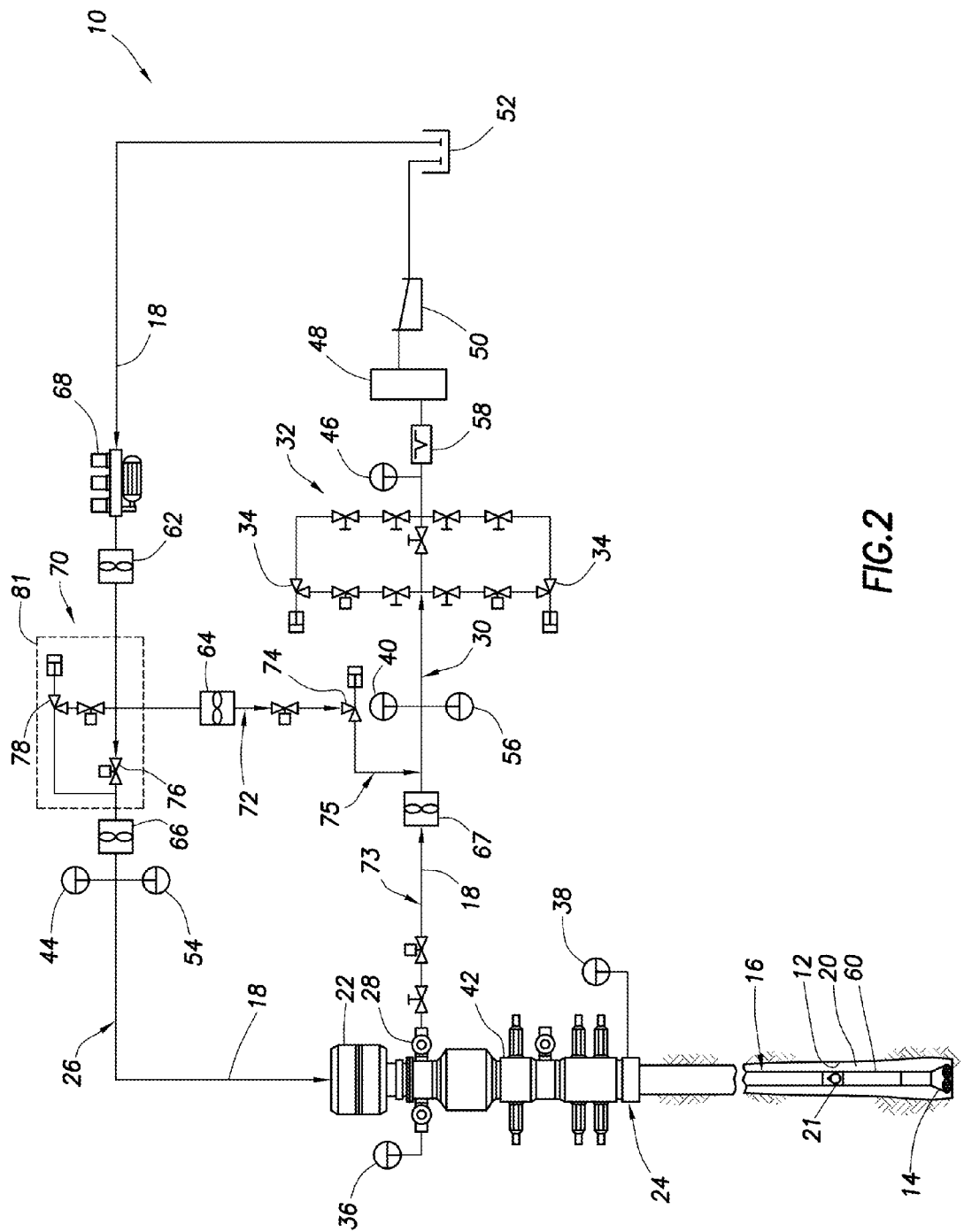
FIG. 2 is a schematic view of another configuration of the well drilling system.

Another alternative is representatively illustrated in FIG. 2. In this configuration of the system 10, the flow control device 78 is in the form of a choke, and the flow restrictor 80 is not used. The flow control device 78 depicted in FIG. 2 enables more precise control over the flow of the fluid 18 into the standpipe line 26 and drill string 16 after a drill pipe connection is made.

Note that each of the flow control devices 74, 76, 78 and chokes 34 are preferably remotely and automatically controllable to maintain a desired bottom hole pressure by maintaining a desired annulus pressure at or near the surface. However, any one or more of these flow control devices 74, 76, 78 and chokes 34 could be manually controlled without departing from the principles of this disclosure.

Figure 3:
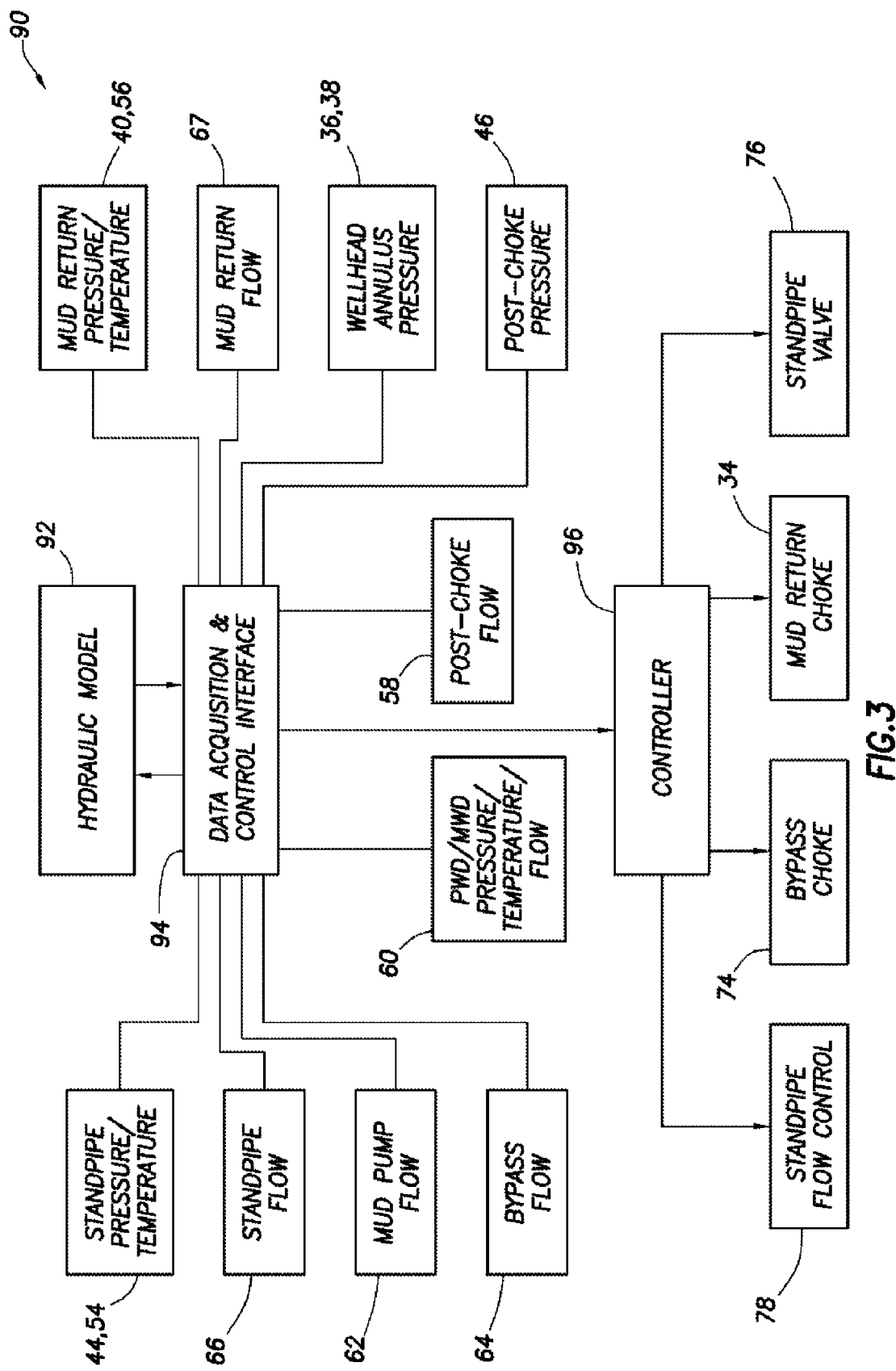
FIG. 3 is a schematic view of a pressure and flow control system which may be used in the well drilling system and method.

A pressure and flow control system 90 which may be used in conjunction with the system 10 and associated methods of FIGS. 1 & 2 is representatively illustrated in FIG. 3. The control system 90 is preferably fully automated, although some human intervention may be used, for example, to safeguard against improper operation, initiate certain routines, update parameters, etc.

The control system 90 includes a hydraulics model 92, a data acquisition and control interface 94 and a controller 96 (such as a programmable logic controller or PLC, a suitably programmed computer, etc.). Although these elements 92, 94, 96 are depicted separately in FIG. 3, any or all of them could be combined into a single element, or the functions of the elements could be separated into additional elements, other additional elements and/or functions could be provided, etc.

The hydraulics model 92 is used in the control system 90 to determine the desired annulus pressure at or near the surface to achieve the desired bottom hole pressure. Data such as well geometry, fluid properties and offset well information (such as geothermal gradient and pore pressure gradient, etc.) are utilized by the hydraulics model 92 in making this determination, as well as real-time sensor data acquired by the data acquisition and control interface 94.

Thus, there is a continual two-way transfer of data and information between the hydraulics model 92 and the data acquisition and control interface 94. For the purposes of this disclosure, it is important to appreciate that the data acquisition and control interface 94 operates to maintain a substantially continuous flow of real-time data from the sensors 44, 54, 66, 62, 64, 60, 58, 46, 36, 38, 40, 56, 67 to the hydraulics model 92, so that the hydraulics model has the information it needs to adapt to changing circumstances and to update the desired annulus pressure, and the hydraulics model operates to supply the data acquisition and control interface substantially continuously with a value for the desired annulus pressure.

A suitable hydraulics model for use as the hydraulics model 92 in the control system 90 is REAL TIME HYDRAULICS™ provided by Halliburton Energy Services, Inc. of Houston, Tex. USA. Another suitable hydraulics model is provided under the trade name IRIS™, and yet another is available from SINTEF of Trondheim, Norway. Any suitable hydraulics model may be used in the control system 90 in keeping with the principles of this disclosure.

A suitable data acquisition and control interface for use as the data acquisition and control interface 94 in the control system 90 are SENTRY™ and INSITE™ provided by Halliburton Energy Services, Inc. Any suitable data acquisition and control interface may be used in the control system 90 in keeping with the principles of this disclosure.

The controller 96 operates to maintain a desired setpoint annulus pressure by controlling operation of the mud return choke 34. When an updated desired annulus pressure is transmitted from the data acquisition and control interface 94 to the controller 96, the controller uses the desired annulus pressure as a setpoint and controls operation of the choke 34 in a manner (e.g., increasing or decreasing flow through the choke as needed) to maintain the setpoint pressure in the annulus 20.

This is accomplished by comparing the setpoint pressure to a measured annulus pressure (such as the pressure sensed by any of the sensors 36, 38, 40), and increasing flow through the choke 34 if the measured pressure is greater than the setpoint pressure, and decreasing flow through the choke if the measured pressure is less than the setpoint pressure. Of course, if the setpoint and measured pressures are the same, then no adjustment of the choke 34 is required. This process is preferably automated, so that no human intervention is required, although human intervention may be used if desired.

The controller 96 may also be used to control operation of the standpipe flow control devices 76, 78 and the bypass flow control device 74. The controller 96 can, thus, be used to automate the processes of diverting flow of the fluid 18 from the standpipe line 26 to the bypass line 72 prior to making a connection in the drill string 16, then diverting flow from the bypass line to the standpipe line after the connection is made, and then resuming normal circulation of the fluid 18 for drilling. Again, no human intervention may be required in these automated processes, other than to initiate each process in turn.

Figure 4:
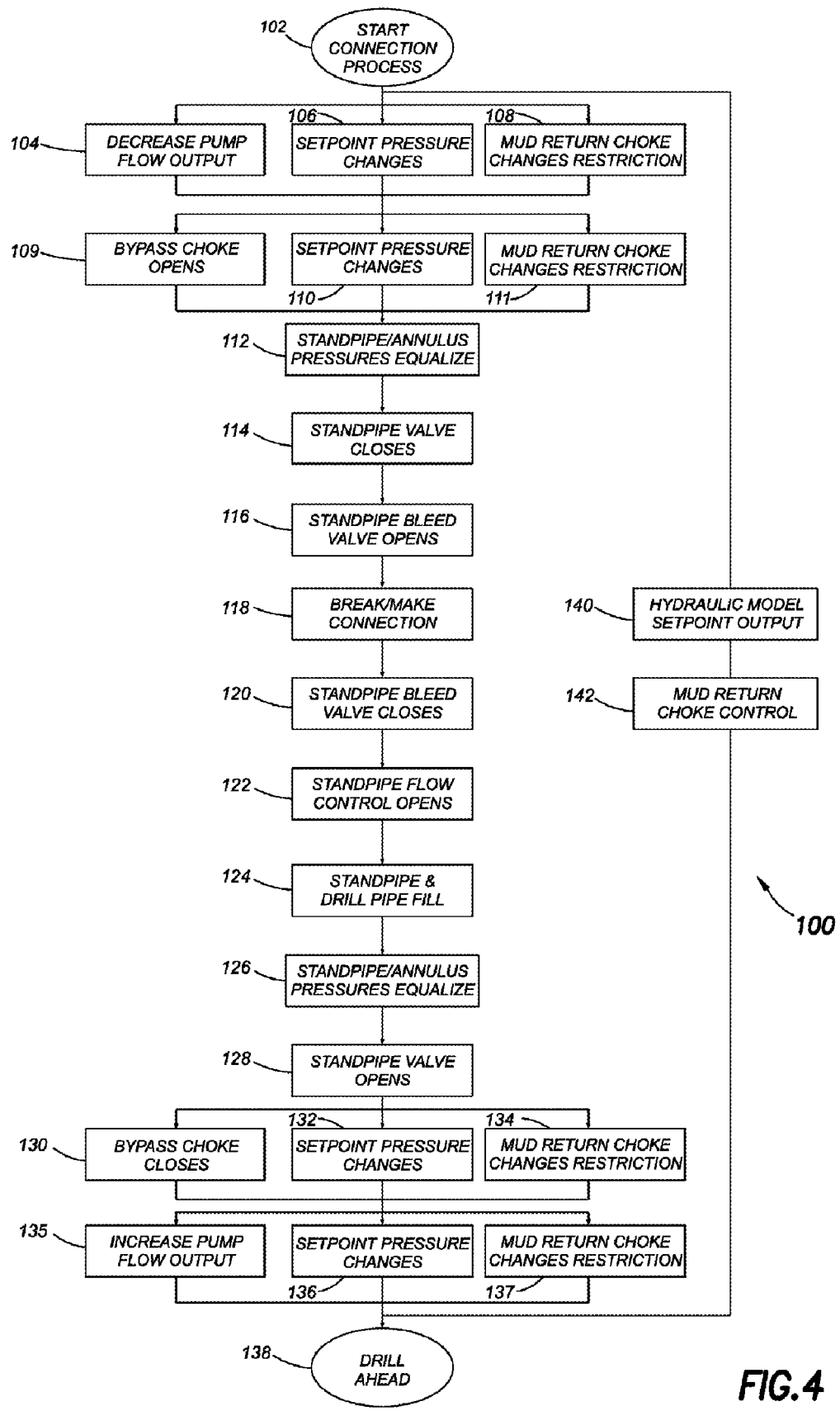
FIG. 4 is a flowchart of a method for making a drill string connection which may be used in the well drilling system and method.

Referring additionally now to FIG. 4, a schematic flowchart is provided for a method 100 for making a drill pipe connection in the well drilling system 10 using the control system 90. Of course, the method 100 may be used in other well drilling systems, and with other control systems, in keeping with the principles of this disclosure.

The drill pipe connection process begins at step 102, in which the process is initiated. A drill pipe connection is typically made when the wellbore 12 has been drilled far enough that the drill string 16 must be elongated in order to drill further.

In step 104, the flow rate output of the pump 68 may be decreased. By decreasing the flow rate of the fluid 18 output from the pump 68, it is more convenient to maintain the choke 34 within its most effective operating range (typically, from about 30% to about 70% of maximum opening) during the connection process. However, this step is not necessary if, for example, the choke 34 would otherwise remain within its effective operating range.

In step 106, the setpoint pressure changes due to the reduced flow of the fluid 18 (e.g., to compensate for decreased fluid friction in the annulus 20 between the bit 14 and the wing valve 28 resulting in reduced equivalent circulating density). The data acquisition and control interface 94 receives indications (e.g., from the sensors 58, 60, 62, 66, 67) that the flow rate of the fluid 18 has decreased, and the hydraulics model 92 in response determines that a changed annulus pressure is desired to maintain the desired bottom hole pressure, and the controller 96 uses the changed desired annulus pressure as a setpoint to control operation of the choke 34.

In a slightly overbalanced managed pressure drilling operation, the setpoint pressure would likely increase, due to the reduced equivalent circulating density, in which case flow through the choke 34 would be decreased in response. However, in some operations (such as, underbalanced drilling operations in which gas or another light weight fluid is added to the drilling fluid 18 to decrease bottom hole pressure), the setpoint pressure could decrease (e.g., due to production of liquid downhole).

In step 108, the restriction to flow of the fluid 18 through the choke 34 is changed, due to the changed desired annulus pressure in step 106. As discussed above, the controller 96 controls operation of the choke 34, in this case changing the restriction to flow through the choke to obtain the changed setpoint pressure. Also as discussed above, the setpoint pressure could increase or decrease.

Steps 104, 106 and 108 are depicted in the FIG. 4 flowchart as being performed concurrently, since the setpoint pressure and mud return choke restriction can continuously vary, whether in response to each other, in response to the change in the mud pump output and in response to other conditions, as discussed above.

In step 109, the bypass flow control device 74 gradually opens. This diverts a gradually increasing proportion of the fluid 18 to flow through the bypass line 72, instead of through the standpipe line 26.

In step 110, the setpoint pressure changes due to the reduced flow of the fluid 18 through the drill string 16 (e.g., to compensate for decreased fluid friction in the annulus 20 between the bit 14 and the wing valve 28 resulting in reduced equivalent circulating density). Flow through the drill string 16 eventually ceases when the bypass flow control device 74 is opened, since the bypass line 72 becomes the path of least resistance to flow. The data acquisition and control interface 94 receives indications (e.g., from the sensors 58, 60, 62, 66, 67) that the flow rate of the fluid 18 through the drill pipe 16 and annulus 20 has decreased, and the hydraulics model 92 in response determines that a changed annulus pressure is desired to maintain the desired bottom hole pressure, and the controller 96 uses the changed desired annulus pressure as a setpoint to control operation of the choke 34.

In a slightly overbalanced managed pressure drilling operation, the setpoint pressure would likely increase, due to the reduced equivalent circulating density, in which case flow through the choke 34 would be decreased in response. However, in some operations (such as, underbalanced drilling operations in which gas or another light weight fluid is added to the drilling fluid 18 to decrease bottom hole pressure), the setpoint pressure could decrease (e.g., due to production of liquid downhole).

In step 111, the restriction to flow of the fluid 18 through the choke 34 is changed, due to the changed desired annulus pressure in step 110. As discussed above, the controller 96 controls operation of the choke 34, in this case changing the restriction to flow through the choke to obtain the changed setpoint pressure. Also as discussed above, the setpoint pressure could increase or decrease.

Steps 109, 110 and 111 are depicted in the FIG. 4 flowchart as being performed concurrently, since the setpoint pressure and mud return choke restriction can continuously vary, whether in response to each other, in response to the bypass flow control device 74 opening and in response to other conditions, as discussed above.

In step 112, the pressures in the standpipe line 26 and the annulus 20 at or near the surface (indicated by sensors 36, 38, 40, 44) equalize. At this point, the bypass flow control device 74 should be fully open, and substantially all of the fluid 18 is flowing through the bypass line 72, 75 and not through the standpipe line 26 (since the bypass line represents the path of least resistance). Static pressure in the standpipe line 26 should substantially equalize with pressure in the lines 30, 73, 75 upstream of the choke manifold 32.

In step 114, the standpipe flow control device 81 is closed. The separate standpipe bypass flow control device 78 should already be closed, in which case only the valve 76 would be closed in step 114.

In step 116, a standpipe bleed valve (not shown) would be opened to bleed pressure and fluid from the standpipe line 26 in preparation for breaking the connection between the kelley or top drive and the drill string 16. At this point, the standpipe line 26 is vented to atmosphere.

In step 118, the kelley or top drive is broken off of the drill string 16, another stand of drill pipe is connected to the drill string, and the kelley or top drive is made up to the top of the drill string. This step is performed in accordance with conventional drilling practice.

In step 120, the standpipe bleed valve is closed. The standpipe line 26 is, thus, isolated again from atmosphere, but the standpipe line and the newly added stand of drill pipe is substantially empty (i.e., not filled with the fluid 18) and un-pressurized.

In step 122, the standpipe bypass flow control device 78 opens (in the case of the valve and flow restrictor configuration of FIG. 1) or gradually opens (in the case of the choke configuration of FIG. 2). In this manner, the fluid 18 is allowed to fill the standpipe line 26 and the newly added stand of drill pipe, as indicated in step 124.

Eventually, the pressure in the standpipe line 26 will equalize with the pressure in the annulus 20 at or near the surface, as indicated in step 126. However, substantially all of the fluid 18 will still flow through the bypass line 72 at this point. Static pressure in the standpipe line 26 should substantially equalize with pressure in the lines 30, 73, 75 upstream of the choke manifold 32.

In step 128, the standpipe flow control device 76 is opened in preparation for diverting flow of the fluid 18 to the standpipe line 26 and thence through the drill string 16. The standpipe bypass flow control device 78 is then closed. Note that, by previously filling the standpipe line 26 and drill string 16, and equalizing pressures between the standpipe line and the annulus 20, the step of opening the standpipe flow control device 76 does not cause any significant undesirable pressure transients in the annulus or mud return lines 30, 73. Substantially all of the fluid 18 still flows through the bypass line 72, instead of through the standpipe line 26, even though the standpipe flow control device 76 is opened.

Considering the separate standpipe flow control devices 76, 78 as a single standpipe flow control device 81, then the flow control device is gradually opened to slowly fill the standpipe line 26 and drill string 16, and then fully opened when pressures in the standpipe line and annulus 20 are substantially equalized.

In step 130, the bypass flow control device 74 is gradually closed, thereby diverting an increasingly greater proportion of the fluid 18 to flow through the standpipe line 26 and drill string 16, instead of through the bypass line 72. During this step, circulation of the fluid 18 begins through the drill string 16 and wellbore 12.

In step 132, the setpoint pressure changes due to the flow of the fluid 18 through the drill string 16 and annulus 20 (e.g., to compensate for increased fluid friction resulting in increased equivalent circulating density). The data acquisition and control interface 94 receives indications (e.g., from the sensors 60, 64, 66, 67) that the flow rate of the fluid 18 through the wellbore 12 has increased, and the hydraulics model 92 in response determines that a changed annulus pressure is desired to maintain the desired bottom hole pressure, and the controller 96 uses the changed desired annulus pressure as a setpoint to control operation of the choke 34. The desired annulus pressure may either increase or decrease, as discussed above for steps 106 and 108.

In step 134, the restriction to flow of the fluid 18 through the choke 34 is changed, due to the changed desired annulus pressure in step 132. As discussed above, the controller 96 controls operation of the choke 34, in this case changing the restriction to flow through the choke to obtain the changed setpoint pressure.

Steps 130, 132 and 134 are depicted in the FIG. 4 flowchart as being performed concurrently, since the setpoint pressure and mud return choke restriction can continuously vary, whether in response to each other, in response to the bypass flow control device 74 closing and in response to other conditions, as discussed above.

In step 135, the flow rate output from the pump 68 may be increased in preparation for resuming drilling of the wellbore 12. This increased flow rate maintains the choke 34 in its optimum operating range, but this step (as with step 104 discussed above) may not be used if the choke is otherwise maintained in its optimum operating range.

In step 136, the setpoint pressure changes due to the increased flow of the fluid 18 (e.g., to compensate for increased fluid friction in the annulus 20 between the bit 14 and the wing valve 28 resulting in increased equivalent circulating density). The data acquisition and control interface 94 receives indications (e.g., from the sensors 58, 60, 62, 66, 67) that the flow rate of the fluid 18 has increased, and the hydraulics model 92 in response determines that a changed annulus pressure is desired to maintain the desired bottom hole pressure, and the controller 96 uses the changed desired annulus pressure as a setpoint to control operation of the choke 34.

In a slightly overbalanced managed pressure drilling operation, the setpoint pressure would likely decrease, due to the increased equivalent circulating density, in which case flow through the choke 34 would be increased in response.

In step 137, the restriction to flow of the fluid 18 through the choke 34 is changed, due to the changed desired annulus pressure in step 136. As discussed above, the controller 96 controls operation of the choke 34, in this case changing the restriction to flow through the choke to obtain the changed setpoint pressure. Also as discussed above, the setpoint pressure could increase or decrease.

Steps 135, 136 and 137 are depicted in the FIG. 4 flowchart as being performed concurrently, since the setpoint pressure and mud return choke restriction can continuously vary, whether in response to each other, in response to the change in the mud pump output and in response to other conditions, as discussed above.

In step 138, drilling of the wellbore 12 resumes. When another connection is needed in the drill string 16, the steps 102-138 can be repeated.

Steps 140 and 142 are included in the FIG. 4 flowchart for the connection method 100 to emphasize that the control system 90 continues to operate throughout the method. That is, the data acquisition and control interface 94 continues to receive data from the sensors 36, 38, 40, 44, 46, 54, 56, 58, 62, 64, 66, 67 and supplies appropriate data to the hydraulics model 92. The hydraulics model 92 continues to determine the desired annulus pressure corresponding to the desired bottom hole pressure. The controller 96 continues to use the desired annulus pressure as a setpoint pressure for controlling operation of the choke 34.

It will be appreciated that all or most of the steps described above may be conveniently automated using the control system 90. For example, the controller 96 may be used to control operation of any or all of the flow control devices 34, 74, 76, 78, 81 automatically in response to input from the data acquisition and control interface 94.

Human intervention would preferably be used to indicate to the control system 90 when it is desired to begin the connection process (step 102), and then to indicate when a drill pipe connection has been made (step 118), but substantially all of the other steps could be automated (i.e., by suitably programming the software elements of the control system 90). However, it is envisioned that all of the steps 102-142 can be automated, for example, if a suitable top drive drilling rig (or any other drilling rig which enables drill pipe connections to be made without human intervention) is used.

It may now be fully appreciated that the above disclosure provides substantial improvements to the art of pressure and flow control in drilling operations. Among these improvements is elimination of the necessity for use of a separate backpressure pump to maintain annulus pressure during drill pipe connections. Also among these improvements is the coordinated gradual diversion of drilling fluid 18 between the standpipe line 26 and bypass line 72 in a manner which eliminates, or at least substantially eliminates, undesirable pressure transients in the annulus 20 when connections are made.

The above disclosure provides a well drilling system 10 for use with a pump 68 which pumps drilling fluid 18 through a drill string 16 while drilling a wellbore 12. A flow control device 81 regulates flow from the pump 68 to an interior of the drill string 16. Another flow control device 74 regulates flow from the pump 68 to a line 75 in communication with an annulus 20 formed between the drill string 16 and the wellbore 12. Flow is simultaneously permitted through the flow control devices 74, 81.

The flow control device 81 may be operable independently from operation of the flow control device 74.

The pump 68 may be a rig mud pump in communication via the flow control device 81 with a standpipe line 26 for supplying the drilling fluid 18 to the interior of the drill string 16. The system 10 is preferably free of any other pump which applies pressure to the annulus 20.

The system 10 can also include another flow control device 34 which variably restricts flow from the annulus 20. An automated control system 90 may control operation of the flow control devices 34, 74 to maintain a desired annulus pressure while a connection is made in the drill string 16. The control system 90 may also control operation of the flow control device 81 to maintain the desired annulus pressure while the connection is made in the drill string 16.

The above disclosure also describes a method of maintaining a desired bottom hole pressure during a well drilling operation. The method includes the steps of: dividing flow of drilling fluid 18 between a line 26 in communication with an interior of a drill string 16 and a line 75 in communication with an annulus 20 formed between the drill string 16 and a wellbore 12; the flow dividing step including permitting flow through a standpipe flow control device 81 interconnected between a pump 68 and the interior of the drill string 16; and the flow dividing step including permitting flow through a bypass flow control device 74 interconnected between the pump 68 and the annulus 20, while flow is permitted through the standpipe flow control device 81.

The method may also include the step of closing the standpipe flow control device 81 after pressures in the line 26 in communication with the interior of the drill string 16 and the line 75 in communication with the annulus 20 equalize.

The method may include the steps of: making a connection in the drill string 16 after the step of closing the standpipe flow control device 81; then permitting flow through the standpipe flow control device 81 while permitting flow through the bypass flow control device 74; and then closing the bypass flow control device 74 after pressures again equalize in the line 26 in communication with the interior of the drill string 16 and in the line 75 in communication with the annulus 20.

The method may also include the step of permitting flow through another flow control device (e.g., choke 34) continuously during the flow dividing, standpipe flow control device closing, connection making and bypass flow control device closing steps, thereby maintaining a desired annulus pressure corresponding to the desired bottom hole pressure.

The method may also include the step of determining the desired annulus pressure in response to input of sensor measurements to a hydraulics model 92 during the drilling operation. The step of maintaining the desired annulus pressure may include automatically varying flow through the flow control device (e.g., choke 34) in response to comparing a measured annulus pressure with the desired annulus pressure.

The above disclosure also describes a method 100 of making a connection in a drill string 16 while maintaining a desired bottom hole pressure. The method 100 includes the steps of:

pumping a drilling fluid 18 from a rig mud pump 68 and through a mud return choke 34 during the entire connection making method 100;

determining a desired annulus pressure which corresponds to the desired bottom hole pressure during the entire connection making method 100, the annulus 20 being formed between the drill string 16 and a wellbore 12;

regulating flow of the drilling fluid 18 through the mud return choke 34, thereby maintaining the desired annulus pressure, during the entire connection making method 100;

increasing flow through a bypass flow control device 74 and decreasing flow through a standpipe flow control device 81, thereby diverting at least a portion of the drilling fluid flow from a line 26 in communication with an interior of the drill string 16 to a line 75 in communication with the annulus 20;

preventing flow through the standpipe flow control device 81;

then making the connection in the drill string 16; and then decreasing flow through the bypass flow control device 74 and increasing flow through the standpipe flow control device 81, thereby diverting at least another portion of the drilling fluid flow to the line 26 in communication with the interior of the drill string 16 from the line 75 in communication with the annulus 20.

The steps of increasing flow through the bypass flow control device 74 and decreasing flow through the standpipe flow control device 81 may also include simultaneously permitting flow through the bypass and standpipe flow control devices 74, 81.

The steps of decreasing flow through the bypass flow control device 74 and increasing flow through the standpipe flow control device 81 further comprise simultaneously permitting flow through the bypass and standpipe flow control devices 74, 81.

The method 100 may also include the step of equalizing pressure between the line 26 in communication with the interior of the drill string 16 and the line 75 in communication with the annulus 20. This pressure equalizing step is preferably performed after the step of increasing flow through the bypass flow control device 74, and prior to the step of decreasing flow through the standpipe flow control device 81.

The method 100 may also include the step of equalizing pressure between the line 26 in communication with the interior of the drill string 16 and the line 75 in communication with the annulus 20. This pressure equalizing step is preferably performed after the step of decreasing flow through the bypass flow control device 74, and prior to the step of increasing flow through the standpipe flow control device 81.

The step of determining the desired annulus pressure may include determining the desired annulus pressure in response to input of sensor measurements to a hydraulics model 92. The step of maintaining the desired annulus pressure may include automatically varying flow through the mud return choke 34 in response to comparing a measured annulus pressure with the desired annulus pressure.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A well drilling system for use with a pump which pumps drilling fluid through a drill string while drilling a wellbore, the system comprising:
   a first flow control device which regulates flow from the pump to an interior of the drill string;
   a second flow control device which regulates flow from the pump through a line in communication with an annulus formed between the drill string and the wellbore; and
   wherein flow is prevented through the second flow control device, and then flow is simultaneously permitted through the first and second flow control devices while maintaining a substantially constant desired pressure in the wellbore.

2. The system of claim 1, wherein the first flow control device is operable independently from operation of the second flow control device.

3. The system of claim 1, wherein the pump is a rig mud pump in communication via the first flow control device with a standpipe line for supplying the drilling fluid to the interior of the drill string.

4. The system of claim 1, wherein the pump is a rig mud pump, and wherein the system is free of any other pump which applies pressure to the annulus.

5. The system of claim 1, further comprising a third flow control device which variably restricts flow from the annulus, and wherein an automated control system controls operation of the second and third flow control devices to maintain a desired annulus pressure while a connection is made in the drill string.

6. The system of claim 5, wherein the control system further controls operation of the first flow control device to maintain the desired annulus pressure while the connection is made in the drill string.

7. A method of maintaining a substantially constant desired pressure during a well drilling operation, the method comprising the steps of:
   dividing flow of drilling fluid between a line in communication with an interior of a drill string and a line in communication with an annulus formed between the drill string and a wellbore;
   the flow dividing step including permitting flow through a first flow control device interconnected between a pump and the interior of the drill string; and
   the flow dividing step including changing a second flow control device interconnected between the pump and the annulus, from preventing flow to permitting flow through the second flow control device, while flow is permitted through the first flow control device and while maintaining the substantially constant desired pressure in the wellbore.

8. The method of claim 7, further comprising the step of closing the first flow control device after pressures in the line in communication with the interior of the drill string and the line in communication with the annulus equalize.

9. The method of claim 8, further comprising the steps of:
   making a connection in the drill string after the first flow control device closing step;
   then permitting flow through the first flow control device while permitting flow through the second flow control device; and
   then closing the second flow control device after pressures again equalize in the line in communication with the interior of the drill string and in the line in communication with the annulus.

10. The method of claim 9, further comprising the step of permitting flow through a third flow control device continuously during the flow dividing, first flow control device closing, connection making and second flow control device closing steps, thereby maintaining a desired annulus pressure corresponding to the desired pressure in the wellbore.

11. The method of claim 10, further comprising the step of determining the desired annulus pressure in response to input of sensor measurements to a hydraulics model during the drilling operation.

12. The method of claim 11, wherein the step of maintaining the desired annulus pressure further comprises automatically varying flow through the third flow control device in response to comparing a measured annulus pressure with the desired annulus pressure.

13. A method of making a connection in a drill string while maintaining a desired bottom hole pressure, the method comprising the steps of:
   pumping a drilling fluid from a rig mud pump and through a mud return choke during the entire connection making method;

determining a desired annulus pressure which corresponds to the desired bottom hole pressure during the entire connection making method;

regulating flow of the drilling fluid through the mud return choke, thereby maintaining the desired annulus pressure, during the entire connection making method;

increasing flow through a bypass flow control device and decreasing flow through a standpipe flow control device, thereby diverting at least a first portion of the drilling fluid flow from a line in communication with an interior of the drill string to a line in communication with an annulus;

preventing flow through the standpipe flow control device;

then making the connection in the drill string; and then decreasing flow through the bypass flow control device and increasing flow through the standpipe flow control device, thereby diverting at least a second portion of the drilling fluid flow to the line in communication with the interior of the drill string from the line in communication with the annulus.

14. The method of claim 13, wherein the steps of increasing flow through the bypass flow control device and decreasing flow through the standpipe flow control device further comprise simultaneously permitting flow through the bypass and standpipe flow control devices.

15. The method of claim 13, wherein the steps of decreasing flow through the bypass flow control device and increasing flow through the standpipe flow control device further comprise simultaneously permitting flow through the bypass and standpipe flow control devices.

16. The method of claim 13, further comprising the step of equalizing pressure between the line in communication with the interior of the drill string and the line in communication with the annulus, the pressure equalizing step being performed after the step of increasing flow through the bypass flow control device, and the pressure equalizing step being performed prior to the step of decreasing flow through the standpipe flow control device.

17. The method of claim 13, further comprising the step of equalizing pressure between the line in communication with the interior of the drill string and the line in communication with the annulus, the pressure equalizing step being performed after the step of decreasing flow through the bypass flow control device, and the pressure equalizing step being performed prior to the step of increasing flow through the standpipe flow control device.

18. The method of claim 13, wherein the step of determining the desired annulus pressure further comprises determining the desired annulus pressure in response to input of sensor measurements to a hydraulics model.

19. The method of claim 18, wherein the step of maintaining the desired annulus pressure further comprises automatically varying flow through the mud return choke in response to comparing a measured annulus pressure with the desired annulus pressure.

* * * * *